(12) United States Patent
Jackson

(10) Patent No.: US 6,415,709 B1
(45) Date of Patent: Jul. 9, 2002

(54) LIFTING MECHANISM FOR A TOASTER

(75) Inventor: Andrew Richard Jackson, North Hykeham (GB)

(73) Assignee: Lincat Group plc, Lincoln (GB)

( * ) Notice: Subject to any disclaimer, the term of this patent is extended or adjusted under 35 U.S.C. 154(b) by 0 days.

(21) Appl. No.: 09/921,990

(22) Filed: Aug. 1, 2001

(30) Foreign Application Priority Data

Aug. 4, 2000 (GB) ............................................. 0019010

(51) Int. Cl.[7] .................................................. A47J 37/08
(52) U.S. Cl. ................... 99/391; 99/329 P; 99/329 RT; 99/385; 99/389; 219/521
(58) Field of Search .................. 99/327–333, 385–391, 99/393, 396, 400–402; 219/492, 494, 497, 489, 521, 525, 528; 392/365, 337, 373, 375; 426/523

(56) References Cited

U.S. PATENT DOCUMENTS

| | | | | |
|---|---|---|---|---|
| 2,503,960 A | * | 4/1950 | McCullough | 99/327 |
| 2,673,516 A | * | 3/1954 | Reichold | 99/327 |
| 2,878,748 A | * | 3/1959 | Stanek | 99/329 P |
| 3,869,970 A | * | 3/1975 | Eagle | 99/329 RT |
| 3,956,978 A | * | 5/1976 | Borley | 219/502 |
| 4,154,151 A | * | 5/1979 | Mochizuki | 99/329 R |
| 4,188,865 A | * | 2/1980 | Bjarsch | 99/327 |
| 4,510,376 A | * | 4/1985 | Schneider | 219/492 |
| 4,755,656 A | * | 7/1988 | Charlesworth et al. | 219/492 X |
| 4,878,423 A | * | 11/1989 | Bikert et al. | 99/391 |
| 5,072,662 A | * | 12/1991 | Yip | 99/327 |
| 5,095,814 A | * | 3/1992 | Ott et al. | 99/391 |
| 5,598,765 A | * | 2/1997 | Yip | 99/391 X |

* cited by examiner

Primary Examiner—Timothy F. Simone
(74) Attorney, Agent, or Firm—Christie, Parker & Hale, LLP

(57) ABSTRACT

A lifting mechanism for a toaster comprises a first arm (2) pivotally mounted about a first horizontal axis (8) for movement between a lowered position and a raised position; a second arm (3) pivotally mounted about a second horizontal axis (9) spaced from and parallel to the first horizontal axis for movement between a lowered position and a raised position; and a raising device connected to at least one of the arms for raising it from its lowered position in its raised position. The arms (2, 3) cross one another at cut outs (4, 5) intermediate their length and interact so that movement of the first arm (2) from its lowered position to its raised position causes movement of the second arm (3) from its raised position to its lowered position.

9 Claims, 3 Drawing Sheets

LIFTING MECHANISM FOR A TOASTER

CROSS-REFERENCE TO RELATED APPLICATION

This application claims priority of United Kingdom patent Application No. 0019010.8, filed on Aug. 4, 2000.

FIELD OF THE INVENTION

The invention relates to a lifting mechanism for a toaster.

BACKGROUND OF THE INVENTION

A lifting mechanism is generally provided in toasters for lifting the slices of bread out of the toaster when toasting is complete. The lifting mechanisms in known toasters generally consist of a single pivotally mounted arm which lifts a slice of bread by engagement of the underside of the slice with the free end of the arm. Such an arrangement acts asymmetrically on the bread and can lead to jamming of the bread in the toaster.

SUMMARY OF THE INVENTION

The present invention provides an improved mechanism in which each slice of bread is raised by a pair of co-operating arms.

Accordingly, the invention provides a lifting mechanism for a toaster comprising: a first arm mounted for movement between a lowered position and a raised, upwardly inclined position; a second arm pivotally mounted for movement between a lowered position and a raised. upwardly inclined position; and raising means connected to at least one of the arms for raising it from its lowered position to its raised position; wherein the arms cross one another intermediate their length and interact with each other such that movement of one of the arms from its lowered position to its raised position causes movement of the other arm from its lowered position to its raised position.

DETAILS DESCRIPTION OF THE PREFERRED EMBODIMENTS

Figure 1:
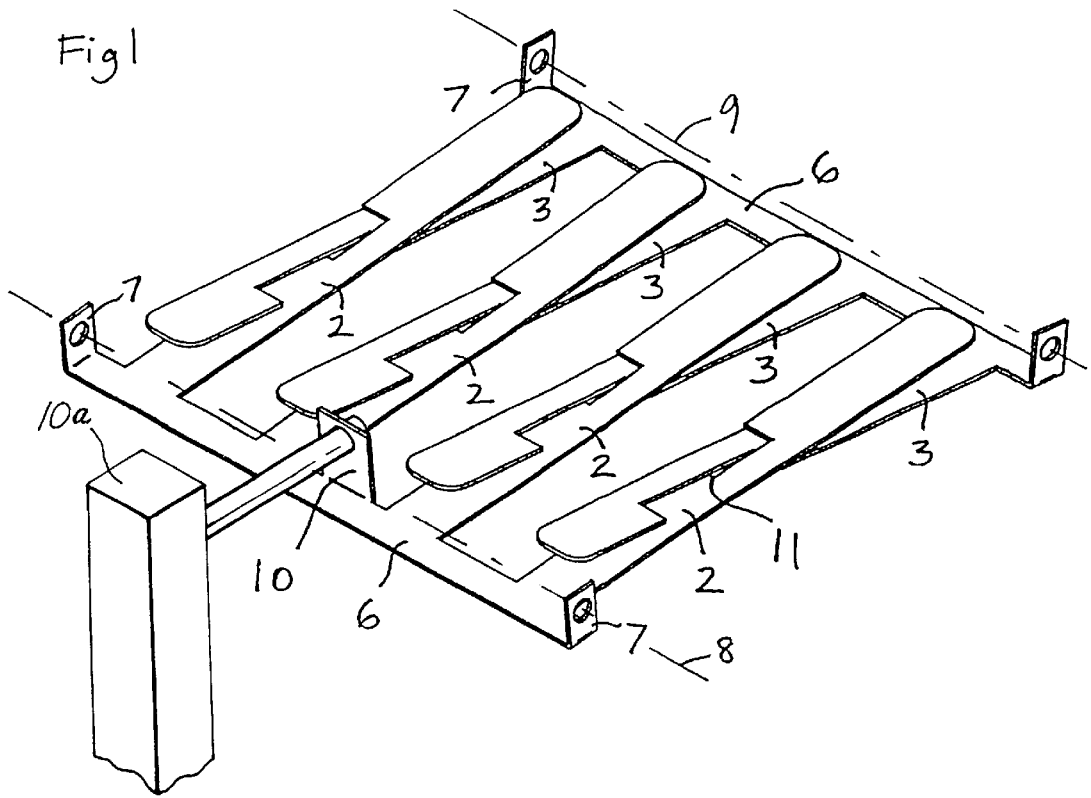
FIG. 1 is an isometric view of a lifting mechanism for a toaster in its lowered position.
Figure 2:
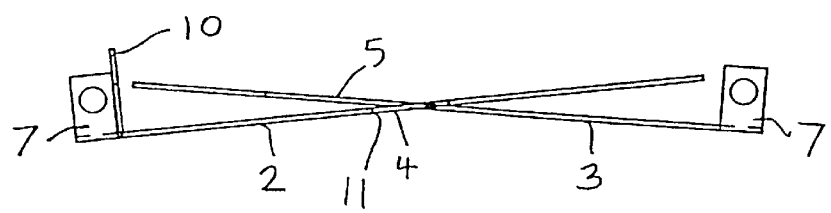
FIG. 2 is an end view of the lifting mechanism.
Figure 3:
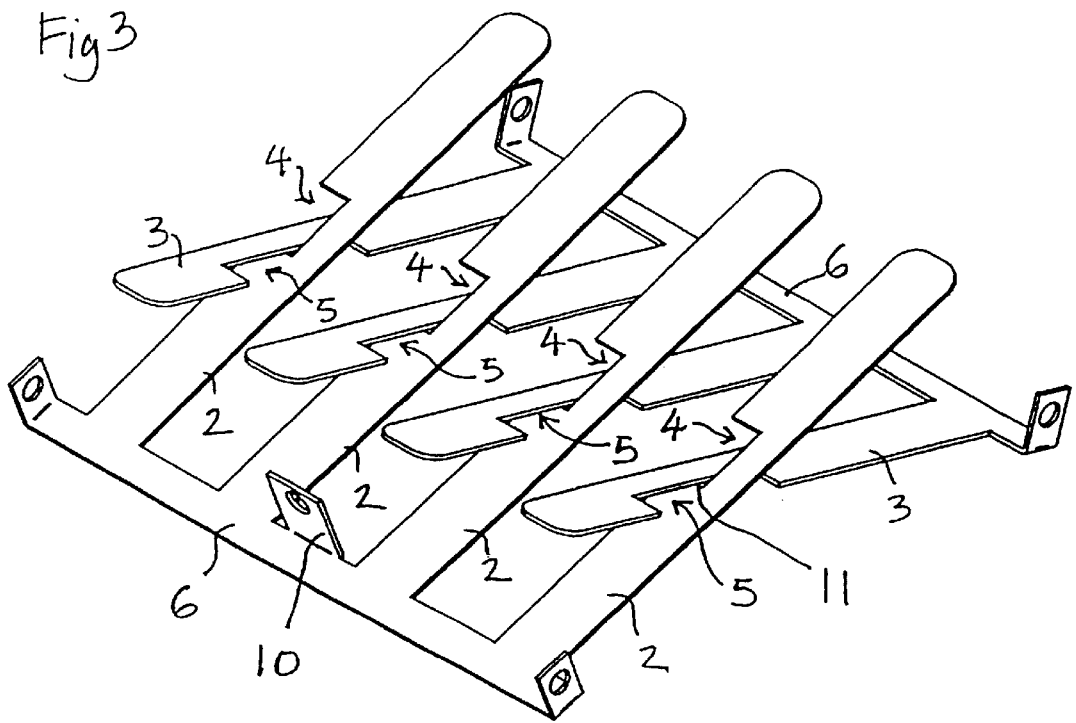
FIG. 3 is an isometric view of a lifting mechanism in a part raised position.
Figure 4:
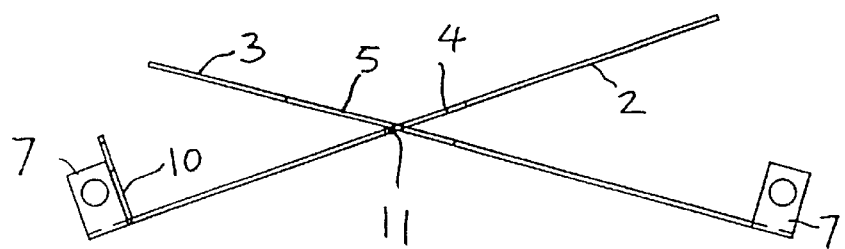
FIG. 4 is an end view of the lifting mechanism.
Figure 5:
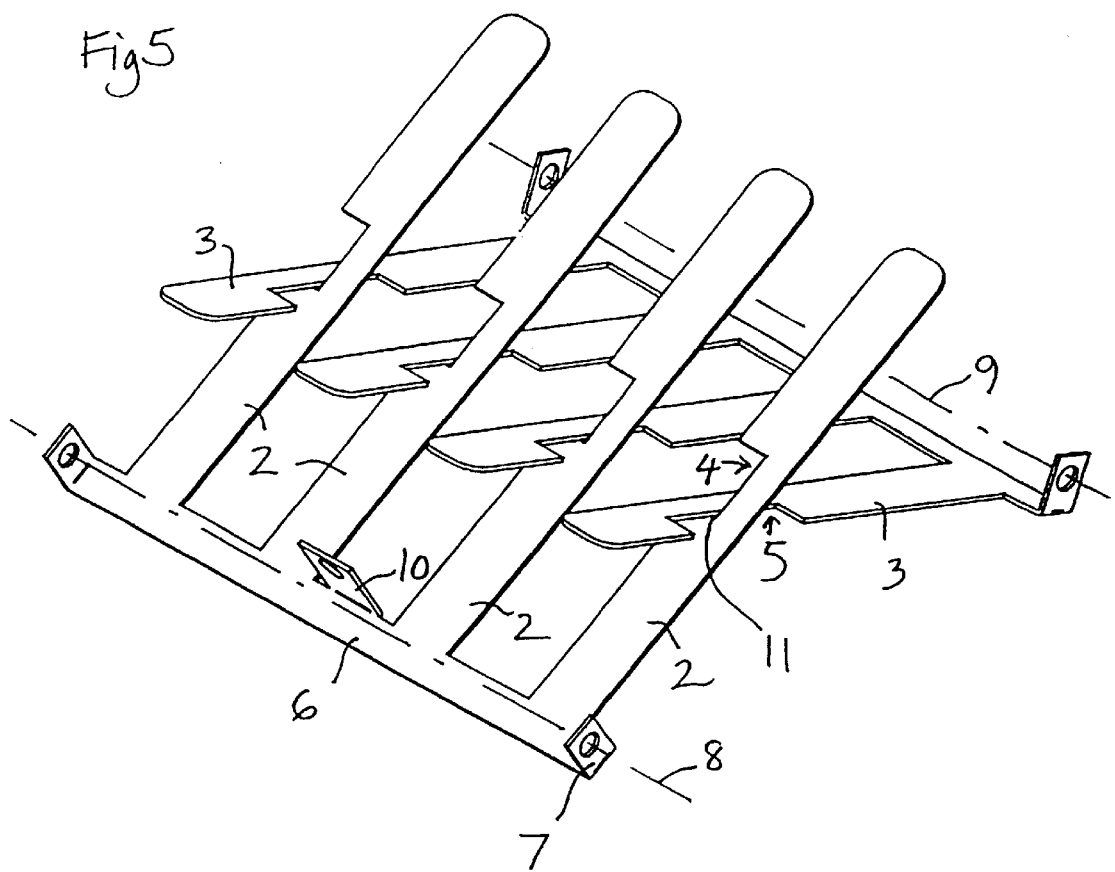
FIG. 5 is an isometric view of a lifting mechanism in its raised position.
Figure 6:
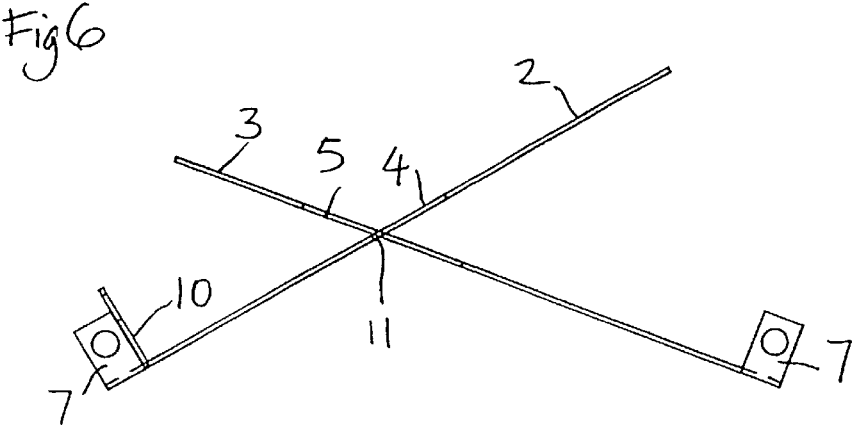
FIG. 6 is an end view of the lifting mechanism.

A lifting mechanism employing a scissor lift action for lifting four slices of bread being toasted is shown in FIGS. 1–6.

The lifting mechanism comprises four of first arms 2 and four second arms 3. Each arm 2, 3 is formed as a flat elongate finger having a cut out portion 4, 5 intermediate its length. The arms 2, 3 are arranged in pairs which cross over one another at the cut out portions 4, 5 such that the arms interact with one another and can substantially overlie one another in the lowered position shown in FIGS. 1 and 2.

In each case, the first and second arms 2, 3 are formed integrally with one another from a single sheet of material with each arm extending from a connecting bar 6. Each connecting bar 6 has bent over portions 7 at each end and the bar and its associated fingers are mounted by means of the portions 7 for pivotal movement about respective horizontal axes 8, 9 which are spaced from and parallel to one another. The arms are mounted for movement between the lowered horizontal or nearly horizontal position shown in FIGS. 1 and 2 and a raised, upwardly inclined position shown in FIGS. 5 and 6. The arms 2, 3 cooperate in pairs moving in vertical planes parallel to and spaced from one another. In use, each pair can lift a slice of bread being toasted.

A further bent up portion 10 is provided on the bar 6 of the first arms 2 which is connected in use to a raising mechanism (not shown) for turning the first arms about the horizontal axis 8 and thus raising them from the lowered to the raised position. The lower end of the cut out 4 in each first arm 2 defines a shoulder 11 which underlies the associated second arm and raises the second arm when the first arm is raised.

The mechanism for raising the arms may be manually operable or electromechanically operable. If preferred, both sets of arms can be directly coupled to a raising mechanism.

What is claimed is:

1. A lifting mechanism for a toaster comprising:

a first arm mounted for movement between a lowered position and a raised position, upwardly inclined;

a second arm mounted for movement between a lowered position and a raised, upwardly inclined position;

and raising means connected to at least one of the arms for raising it from its lowered position to its raised position;

wherein the arms cross one another intermediate their length and interact with each other such that movement of one of the arms from its lowered position to its raised position causes movement of the other arm from its lowered position to its raised position.

2. A lifting mechanism as claimed in claim 1, wherein the first arm is pivotally mounted about a first horizontal axis for movement between the lowered and raised portions and the second arm is pivotally mounted about a second horizontal axis spaced from and parallel to the first horizontal axis for movement between the lowered and raised positions.

3. A lifting mechanism as claimed in claim 1, wherein each arm is formed as a flat elongate finger having a cut out intermediate its length and wherein the arms cross over one another at the cut out portions such that the arms substantially overlie one another when in their lowered positions.

4. A lifting mechanism as claimed in claim 3, wherein the raising means is connected to the first arm and wherein one end of the cut out in the first arm defines a shoulder which underlies the second arm and raises the second arm when the first arm is raised.

5. A lifting mechanism according to claim 1, wherein a plurality of pairs of first and second arms is provided with the pairs operating in vertical planes parallel to and spaced from one another.

6. A lifting mechanism as claimed in claim 5, wherein in each case the first and second arms are formed integrally with one another, each extending from a connecting bar.

7. A lifting mechanism as claimed in claim 6, wherein each connecting bar has bent over portions at each end by means of which the bar and associated fingers is pivotally mounted about its horizontal axis.

8. A lifting mechanism as claimed in claim 1, wherein the means for raising the arms is manually operable.

9. A lifting mechanism as claimed in claim 1, wherein the means for raising the arms is electromechanically operable.

* * * * *